United States Patent
Jeon et al.

(10) Patent No.: US 7,605,895 B2
(45) Date of Patent: Oct. 20, 2009

(54) IPS MODE LIQUID CRYSTAL DISPLAY USING TWO SHEETS OF BIAXIAL NEGATIVE RETARDATION FILM AND A PLATE

(75) Inventors: Byoung Kun Jeon, Yuseong-gu (KR);
Sergey Belyaev, Yuseong-gu (KR);
Nikolay Malimonenko, Yuseong-gu (KR); Jun Won Chang, Yuseong-gu (KR); Soo Jin Jang, Gangdong-gu (KR); Sang Choll Han, Yuseong-gu (KR)

(73) Assignee: LG Chem, Ltd., Seoul (KR)

( * ) Notice: Subject to any disclaimer, the term of this patent is extended or adjusted under 35 U.S.C. 154(b) by 154 days.

(21) Appl. No.: 11/450,960

(22) Filed: Jun. 12, 2006

(65) Prior Publication Data
US 2006/0285051 A1    Dec. 21, 2006

(30) Foreign Application Priority Data
Jun. 14, 2005  (KR) ............... 10-2005-0050856

(51) Int. Cl.
*G02F 1/1335* (2006.01)
*G02F 1/1343* (2006.01)
(52) U.S. Cl. .............. 349/119; 349/117; 349/118; 349/120; 349/141
(58) Field of Classification Search .......... 349/141, 349/117–121
See application file for complete search history.

(56) References Cited

U.S. PATENT DOCUMENTS

| | | | |
|---|---|---|---|
| 5,895,106 A * | 4/1999 | VanderPloeg et al. | 349/120 |
| 6,359,671 B1 * | 3/2002 | Abileah | 349/119 |
| 6,642,981 B1 * | 11/2003 | Ohmuro et al. | 349/120 |
| 2002/0033923 A1 * | 3/2002 | Shimoshikiryou et al. | 349/141 |
| 2003/0193636 A1 * | 10/2003 | Allen et al. | 349/117 |
| 2006/0114383 A1 * | 6/2006 | Kobayashi et al. | 349/117 |

FOREIGN PATENT DOCUMENTS

| | | |
|---|---|---|
| JP | 10-153802 | 6/1998 |
| JP | 2002-148620 | 5/2002 |
| JP | 2002-250941 | 9/2002 |
| JP | 2003-262869 | 9/2003 |
| JP | 2003-262870 | 9/2003 |
| JP | 2003-262871 | 9/2003 |
| KR | 10-2003-0079705 A | 10/2003 |
| KR | 10-2005-0031940 A | 4/2005 |
| KR | 10-2005-0039587 A | 4/2005 |

* cited by examiner

*Primary Examiner*—Andrew Schechter
*Assistant Examiner*—Paisley L Arendt
(74) *Attorney, Agent, or Firm*—McKenna Long & Aldridge LLP

(57) ABSTRACT

Disclosed herein is an IPS-LCD using two sheets of negative (−) biaxial retardation films and one +C-plate. The IPS-LCD has a superior contrast ratio at the surface-facing angle and tilt angles and undergoes a minimal color change with viewing angles in a black state, thereby providing a wider viewing angle.

17 Claims, 7 Drawing Sheets

[Figure 1]
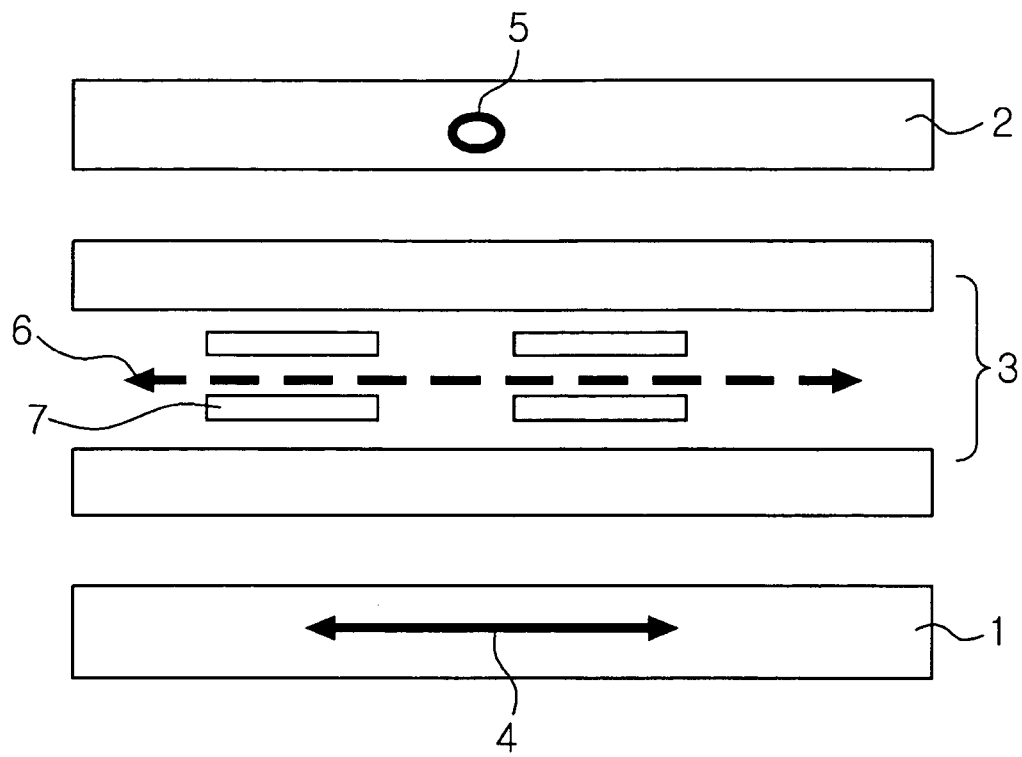
--Prior Art--
[Figure 2]
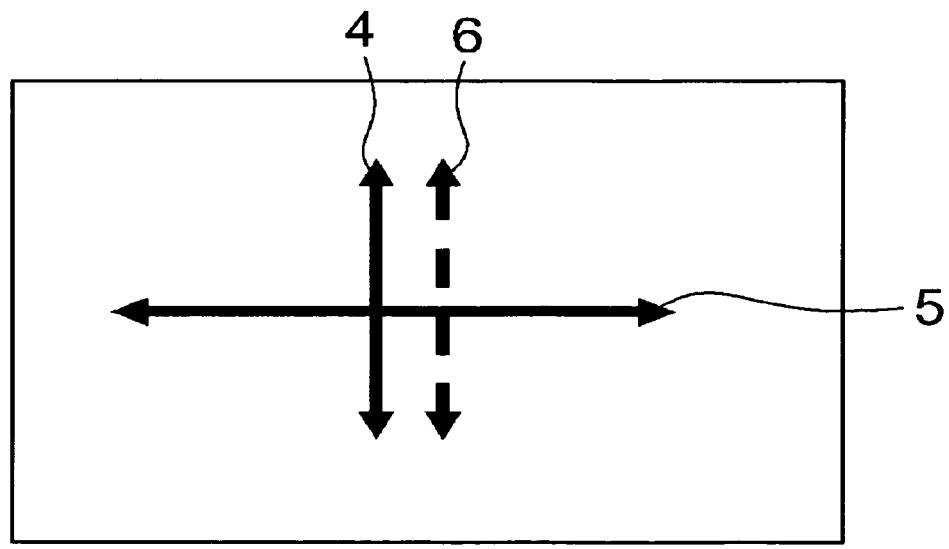
--Prior Art--

[Figure 3]
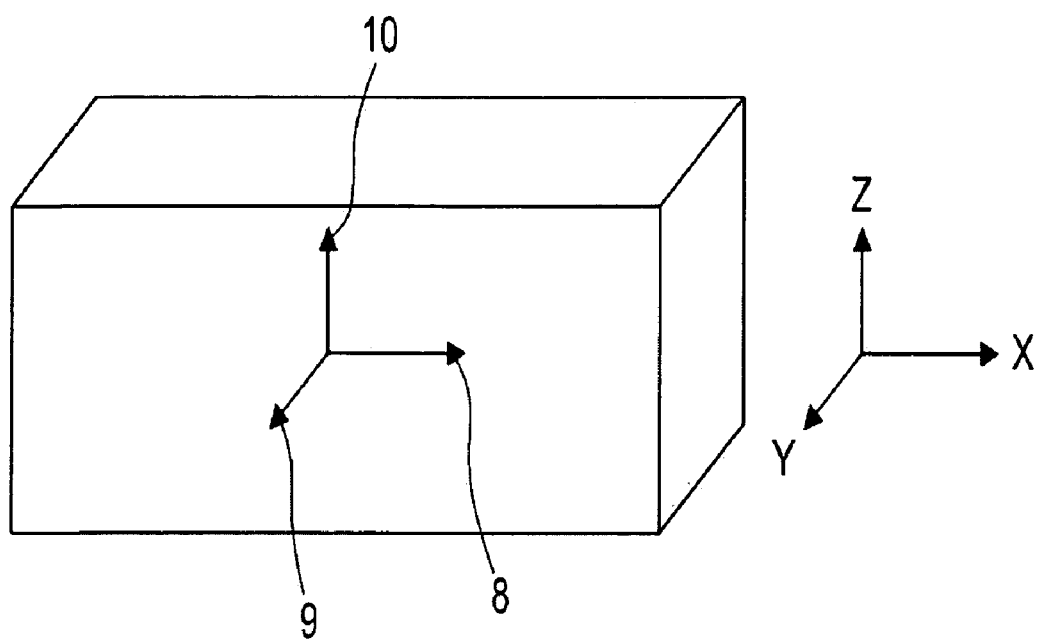

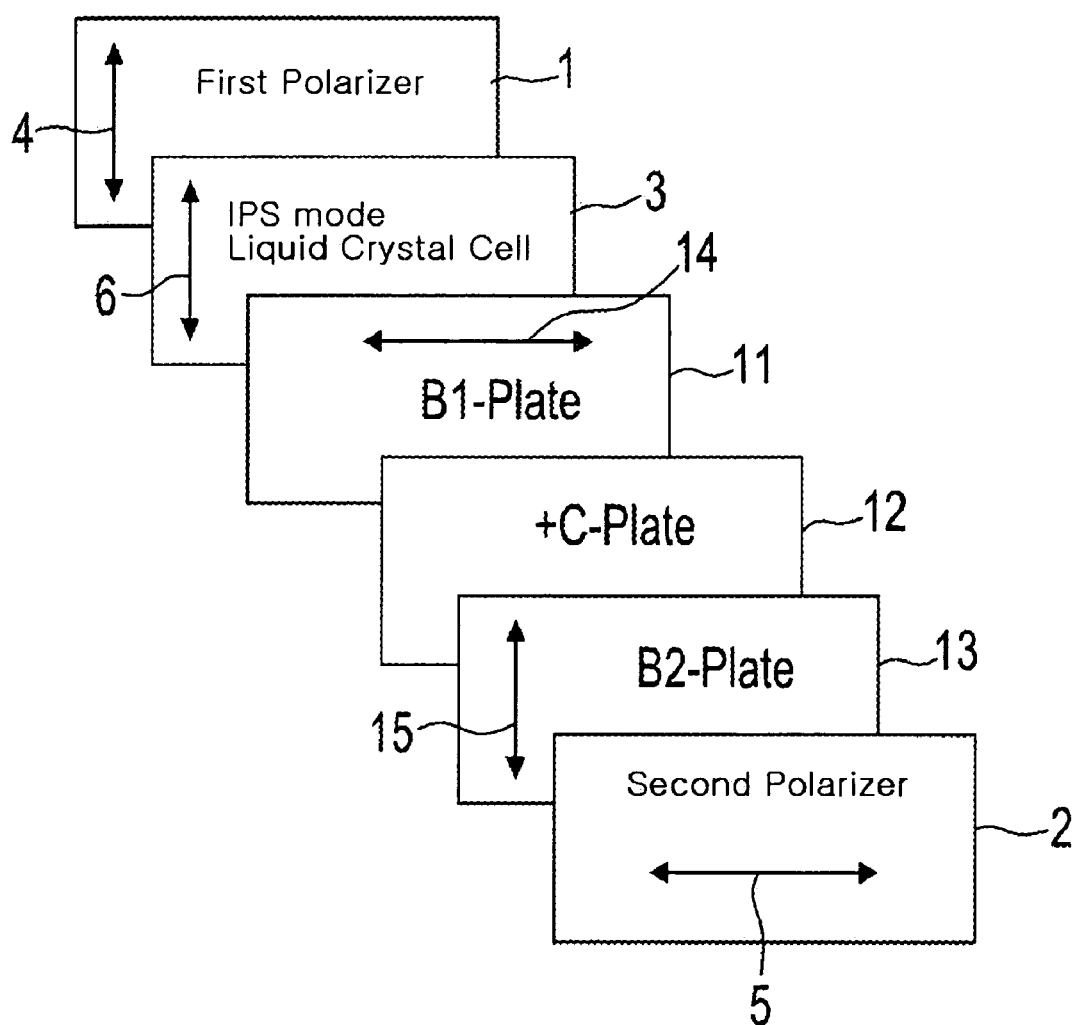
[Figure 4]

[Figure 5]
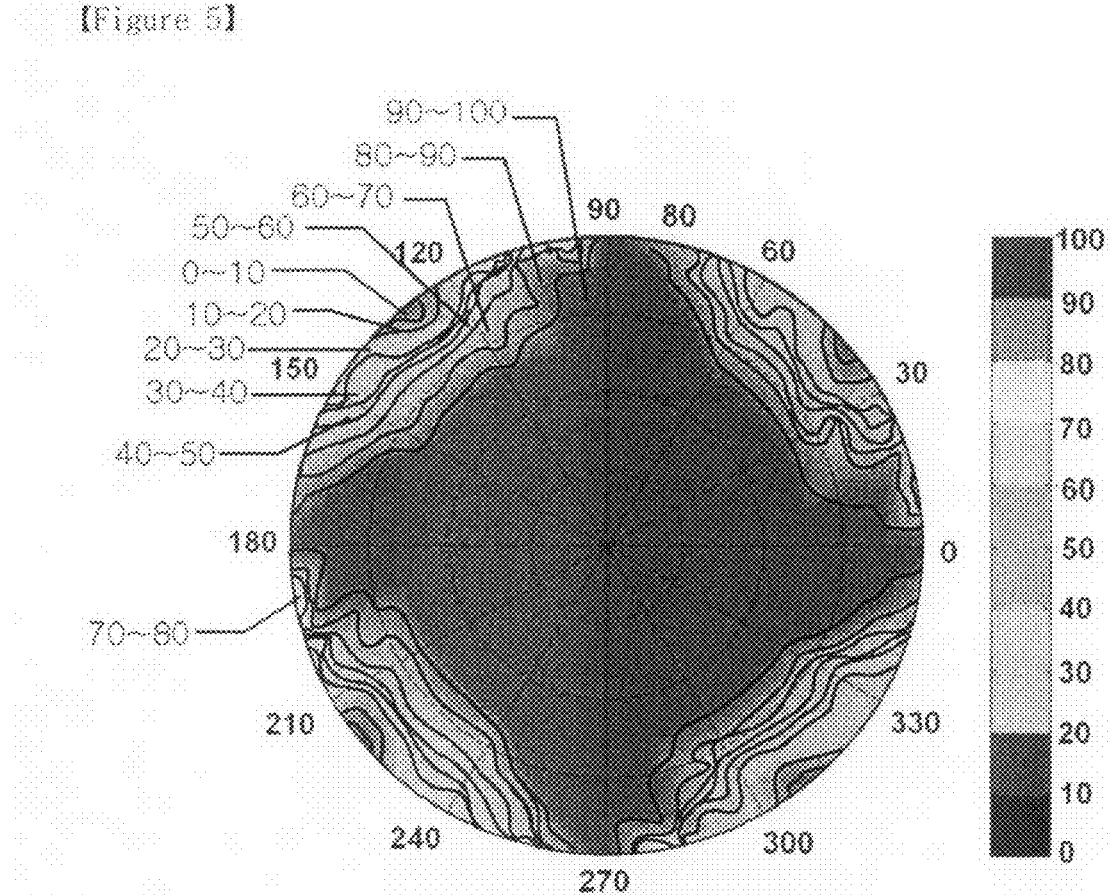
[Figure 6]
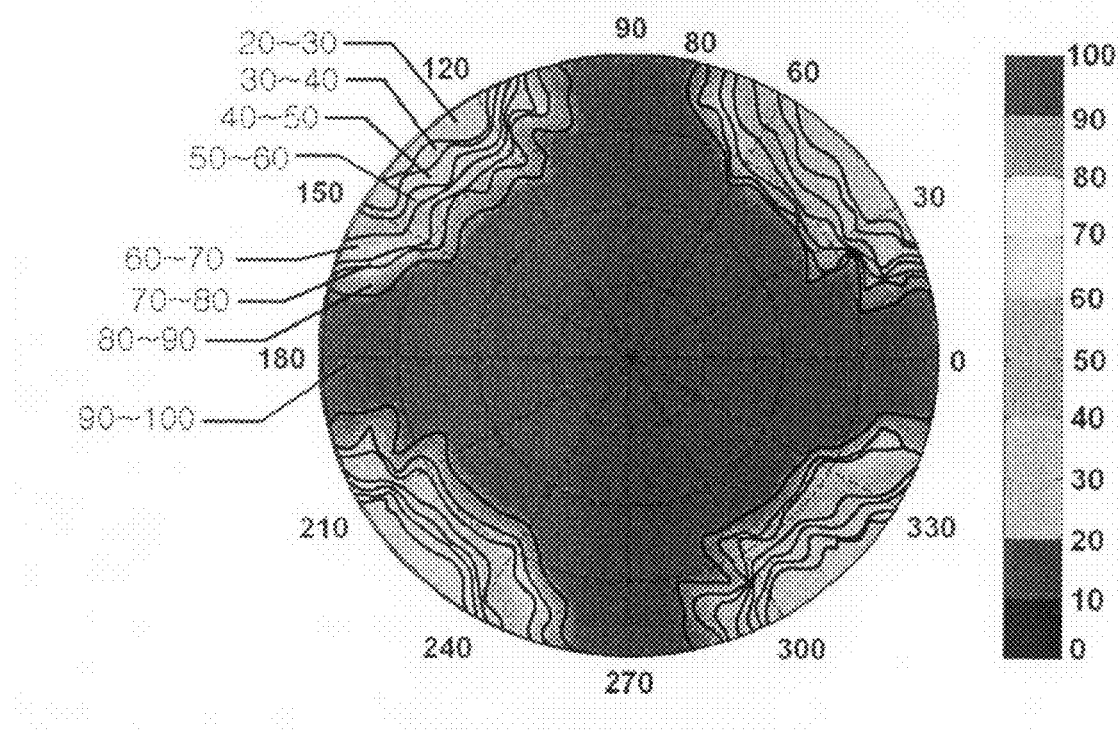

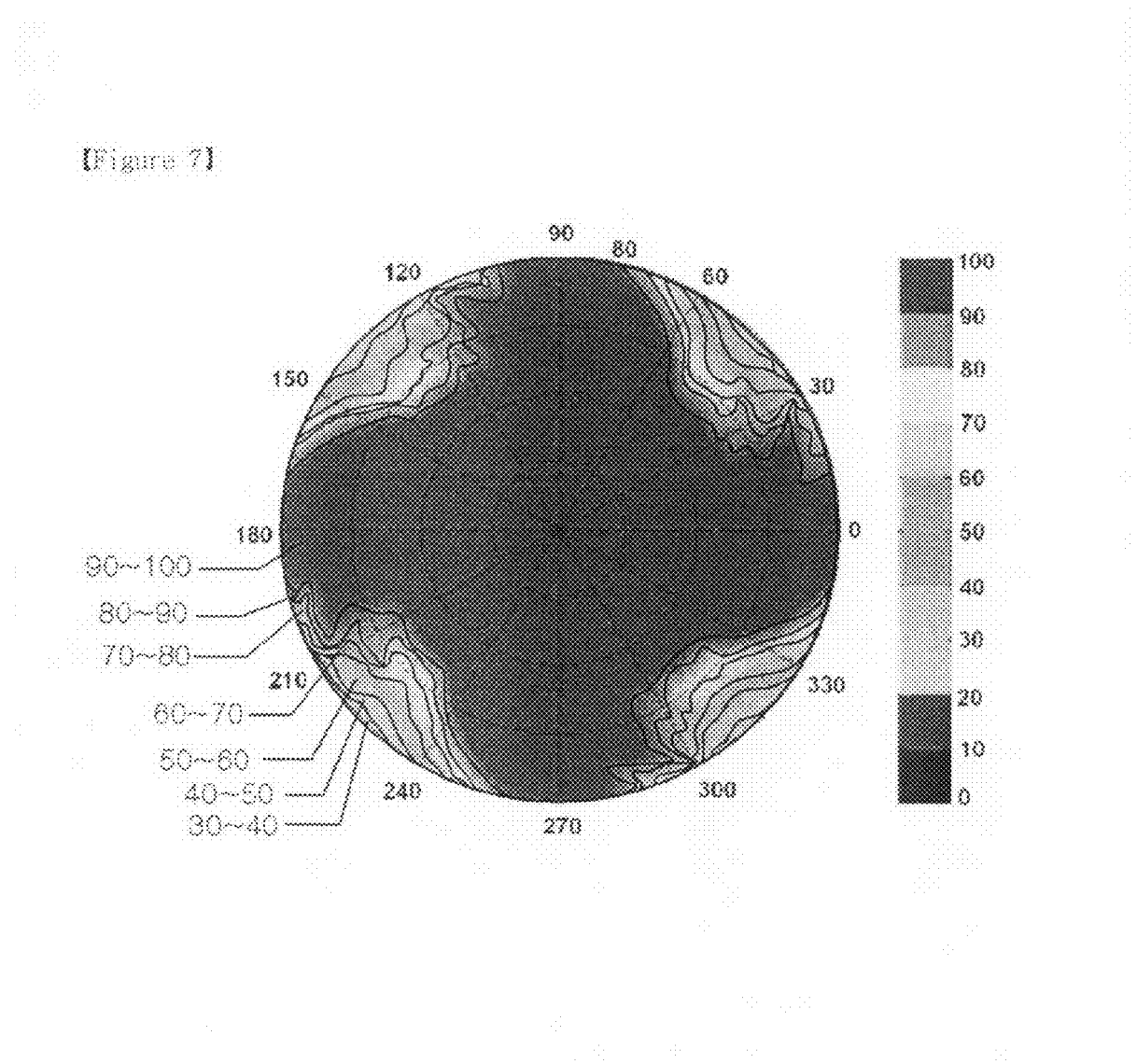

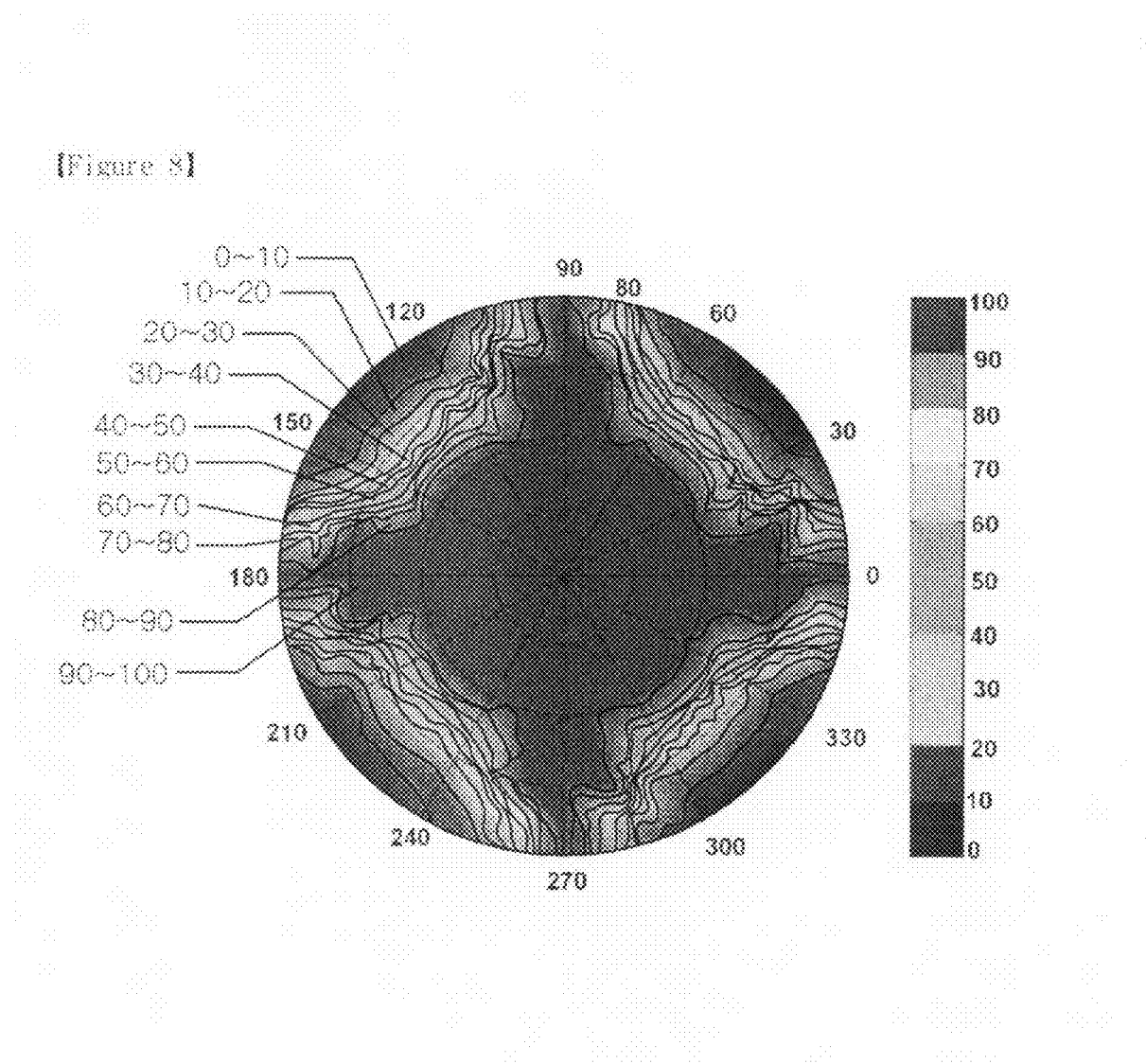
[Figure 8]

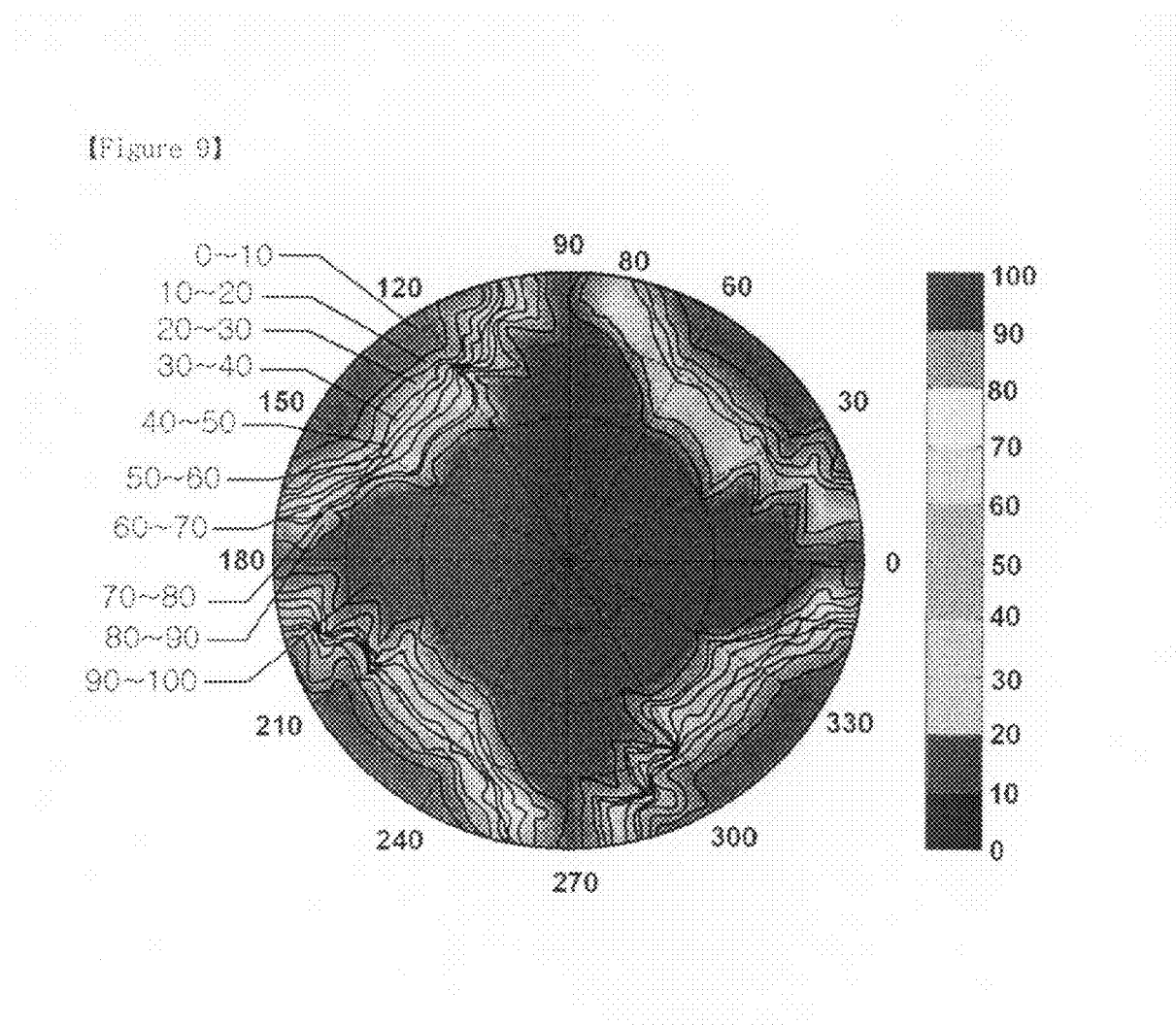
[Figure 9]

IPS MODE LIQUID CRYSTAL DISPLAY USING TWO SHEETS OF BIAXIAL NEGATIVE RETARDATION FILM AND A PLATE

This application claims the benefit of Korean Patent Application No. 10-2005-0050856, filed on Jun. 14, 2005, which is hereby incorporated by reference for all purposes as if fully set forth herein.

TECHNICAL FIELD

The present invention relates to an in-plane switching mode liquid crystal display (IPS-LCD) which employs two negative (−) biaxial retardation films and a +C-plate as optical compensation films. More particularly, the present invention relates to the use of two negative (−) biaxial retardation films and a +C-plate as optical compensation films for improving viewing angles of an IPS-LCD filled with liquid crystal molecules positive dielectric anisotropy ($^\Delta\epsilon > 0$), thereby assuring high contrast properties and wide viewing angles at the surface-facing angle and tilt angles, and a small color shift in a black state.

This application claims the benefit of the filing date of Korean Patent Application Nos. 10-2005-0050856, filed on Jun. 14, 2005, in the Korean Intellectual Property Office, the disclosure of which is incorporated herein in its entirety by reference.

BACKGROUND ART

A TN (twisted nematic) mode LCD is a common type of conventional LCD using liquid crystal molecules that have positive dielectric anisotropy and are horizontally aligned in a twisted state between two facing substrates. However, the TN mode LCDs cannot display an absolute black state because of light leakage attributable to the birefringence due to the liquid crystal molecules near the substrates even when in an OFF-state. Meanwhile, there are LCDs to which various modes have recently been introduced so as to increase the width of viewing angles. Out of them, IPS-LCDs can display an almost complete black state in an OFF-state by way of the alignment of polarizers on the upper and lower surfaces of the substrates because the liquid crystal molecules are almost horizontally and uniformly aligned to the surfaces of the substrates in an OFF-state so that the light undergoes no change in the polarizer and thus can pass through the liquid crystal layer intact.

Without optical films, generally, wide viewing angles can be realized in these IPS-LCDs which thus assure high transmissivity and have uniform images and viewing angles over the screen. For these reasons, IPS-LCDs are prevalent in high quality displays having 18-inch or larger screens. In contrast, VA (vertically aligned) mode LCDs impart a display with a fast response speed, but have low transmissivity due to the presence of retardation films between liquid crystal cells and polarizers, required to solve the problems of phase difference and light leakage. Particularly, when subjected to external pressure, VA mode LCDs suffers from the disadvantage of low uniformity and stability due to liquid crystal dynamics.

Various examples of VA mode LCDs to which retardation films are applied to solve the problems of phase difference and light leakage are found in Japanese Pat. Laid-Open Publication Nos. 2003-262869, 2003-262870, and 2003-262871, in which a first and a second retardation plate, each consisting of at least one uni- or biaxial retardation film, is disposed between a first polarizer and a liquid crystal cell and between a second polarizer and the liquid crystal cell, respectively. The retardation film for use in compensating for viewing angles comprises an A-plate for compensating for in-plane retardation ($R_{in}$) and a C-plate for compensating for retardation in the thickness direction ($R_{th}$) that are placed properly so as to compensate viewing angles.

Examples of the IPS-LCDs which use optical retardation films to improve viewing angles are described in Korean Pat. Laid-Open Publication Nos. 2005-0031940, 2003-0079705 and 2005-0039587, the last invented by the present inventors, where a +A-plate and a +C-plate are arranged between the liquid crystal layer and the polarizer.

In the art, much effort has continued to be made to widen viewing angles by way of, for example, novel and versatile lamination structures and configuring of retardation values.

DISCLOSURE

[Technical Problem]

Accordingly, the present invention has been made keeping in mind the above problems occurring in the prior art, and an object of the present invention is to provide an IPS-LCD filled with liquid crystal molecules having positive dielectric anisotropy, which has a novel laminated structure of retardation films so as to improve contrast properties at the surface-facing angle and tilt angles and minimize color change according to viewing angles in a black state, thereby providing a wider viewing angle than that of conventional LCDs.

[Technical Solution]

In accordance with an aspect of the present invention, provided is an in-plane switching mode liquid crystal display, comprising a liquid crystal cell filled with liquid crystal molecules of positive dielectric anisotropy ($^\Delta\epsilon > 0$) that are horizontally aligned between two substrates, placed between a first polarizer and a second polarizer the respective absorption axes of which are perpendicular to each other, wherein a) a first negative (−) biaxial retardation film, arranged adjacent to the liquid crystal cell in such a manner so that its optical axis is perpendicular to the optical axis of the liquid crystal cell; b) a second negative (−) biaxial retardation film, arranged adjacent to the second polarizer in such a manner so that its optical axis is perpendicular to the absorption axis of the second polarizer; and c) a +C-plate arranged between the first negative (−) biaxial retardation film and the second negative (−) biaxial retardation film, are provided between the liquid crystal cell and the second polarizer.

In accordance with the present invention, a backlight source is placed near the first polarizer or the second polarizer. Preferably, the first polarizer is placed near the backlight source of the LCDs. The first polarizer has an absorption axis perpendicular or parallel to the optical axis of the liquid crystal cell. Preferably, the first polarizer has an absorption axis parallel to the optical axis of the liquid crystal cell.

In an embodiment, the +C-plate is preferred to have a thickness retardation value larger than the absolute value of the sum of thickness retardation values of the first negative (−) biaxial retardation film and the second negative (−) biaxial retardation film, as represented by $R_{th,+C} > |R_{th,biaxial}|$. In addition, when a wavelength of 550 nm is used, both the first and the second negative (−) biaxial retardation film range in in-plane retardation value from 20 nm to 100 nm while the +C-plate ranges in thickness retardation value from 50 nm to 500 nm.

Preferably, the second negative (−) biaxial retardation film is used as an inner protective film for the polarizer. The +C-plate may be made from a polymeric material or a UV-cured liquid crystal film.

[Advantageous Effects]

Having a contrast ratio of as high as 58.6:1 at the surface-facing angle and tilt angles, and undergoing a minimal color change with viewing angles in a black state, the IPS-LCD according to the present invention exhibits superior viewing angle compensation properties.

DESCRIPTION OF DRAWINGS

FIG. 1 is a cross sectional view showing the structure of a typical IPS-LCD.

FIG. 2 is a schematic view showing the arrangement relationship between an absorption axis of a polarizer and an optical axis of liquid crystal molecules in the IPS-LCD having the cross sectional structure of FIG. 1.

FIG. 3 is a view showing the definition of refractive indices of a retardation film.

FIG. 4 is a disassembled plan view showing the structure of an IPS-LCD according to a preferred embodiment of the present invention.

FIG. 5 is a view showing simulation results for the contrast ratio of the IPS-LCD according to Example 1-9 of the present invention at tilt angles from 0° to 80° with respect to entire radius angles when white light is used.

FIG. 6 is a view showing simulation results for the contrast ratio of the IPS-LCD according to Example 2-9 of the present invention at tilt angles from 0° to 80° with respect to entire radius angles when white light is used.

FIG. 7 is a view showing simulation results for the contrast ratio of the IPS-LCD according to Example 3-10 of the present invention at tilt angles from 0° to 80° with respect to entire radius angles when white light is used.

FIG. 8 is a view showing simulation results for the contrast ratio of the IPS-LCD according to Example 4-2 of the present invention at tilt angles from 0° to 80° with respect to entire radius angles when white light is used.

FIG. 9 is a view showing simulation results for the contrast ratio of the IPS-LCD according to Example 4-3 of the present invention at tilt angles from 0° to 80° with respect to entire radius angles when white light is used.

(1: first polarizer, 2: second polarizer, 3: in-plane switching (IPS) mode liquid crystal cell, 4: absorption axis of the first polarizer, 5: absorption axis of the second polarizer, 6: rubbing direction, 7: liquid crystal molecules, 8: refractive index in an x-axis direction, 9: refractive index in a y-axis direction, 10: refractive index in a z-axis direction, 11: first negative (−) biaxial retardation film, 12: +C-plate, 13: second negative (−) biaxial retardation film, 14, 15: optical axis)

MODE FOR INVENTION

Below, a detailed description is given of the present invention with reference to the accompanying drawings.

In advance of presenting preferred embodiments of the present invention, a typical IPS-LCD is described to elucidate the basic structure, optical axis arrangement, and refractive index relationship of retardation films, with reference to FIGS. 1 to 3.

FIG. 1 is a cross sectional view showing the basic structure of an IPS-LCD in which an in-plane switching mode liquid crystal cell 3 is positioned between a first polarizer 1 and a second polarizer 2. The liquid crystal cell 3 is filled with liquid crystal molecules having positive dielectric anisotropy ($^{\Delta}\epsilon > 0$), which are horizontally aligned, between two glass substrates, as shown in the figure.

The absorption axes of the polarizers and the optical axis of the liquid crystal molecules in the IPS-LCDs are illustrated in FIG. 1 showing the cross sectional structure of the IPS-LCDs and FIG. 2 showing the arrangement of optical axes. As shown in the figures, the absorption axis 4 of the first polarizer 1 is arranged perpendicular to the absorption axis 5 of the second polarizer 2 and parallel to the optical axis 6 of a IPS mode liquid crystal cell 3. Typically, the first polarizer 1, the absorption axis of which is parallel to the optical axis of the IPS mode liquid crystal cell 3 of an in-plane switching mode, is preferred to be placed near a backlight source.

With reference to FIG. 3, a schematic view is provided for describing refractive indices relationship of retardation films used to compensate for viewing angles. When the refractive index in an x-axis direction is represented by $n_x$ 8, the refractive index in a y-axis direction is represented by $n_y$ 9, and the refractive index in a z-axis direction is represented by $n_z$ 10, the properties of the retardation film depend on the size of the refractive indices. When two among the three refractive indices of the respective axis directions differ from each other, the retardation film is called a uniaxial retardation film, which can be defined as follows:

When $n_x > n_y = n_z$, it is a +A-plate and an in-plane retardation value can be defined using the difference between the two in-plane refractive indices and the thickness of the film. That is, $R_{in}$ (in-plane retardation value) $= d \times (n_x - n_y)$, wherein d represents a film thickness.

When $n_x = n_y < n_z$, it is a +C-plate and a thickness retardation value ($R_{th}$) can be defined using the difference between in-plane refractive index and the thickness refractive index, and the thickness of the film, as represented by $R_{th} = d \times (n_z - n_y)$, wherein d represents the film thickness. The +C-plate has an in-plane retardation value of almost zero and a positive thickness retardation value. The wavelength dispersion characteristics of the +C-plate film can be divided into normal wavelength dispersion, flat wavelength dispersion and reverse wavelength dispersion.

In contrast to the uniaxial retardation film, a biaxial retardation film has three refractive indices of respective axis directions which differ from one another. A biaxial retardation film can be defined as follows:

When $n_x > n_y > n_z$ wherein the refractive index in an x-axis direction is represented by $n_x$ 8, the refractive index in a y-axis direction is represented by $n_y$ 9, and the refractive index in a z-axis direction is represented by $n_z$ 10, it is a negative (−)

biaxial retardation film having both an in-plane retardation value ($R_{in}=d\times(n_x-n_y)$) and a thickness retardation value ($R_{th}=d\times(n_z-n_y)$), wherein d represents a film thickness.

In accordance with an embodiment of the present invention, the +C-plate and negative (−) biaxial retardation films defined as in the above can be properly arranged so as to improve viewing angles, as shown in the disassembled plan view of FIG. 4.

As seen in FIG. 4, an optical compensation film consisting of a first negative (−) biaxial retardation film 11 and a second negative (−) biaxial retardation film 13 with a +C-plate sandwiched therebetween is placed between an in-plane switching liquid crystal cell 3 and a second polarizer 2.

In the IPS mode liquid crystal cell 3 placed between the first polarizer 1 and the second polarizer 2 the respective absorption axes of which are perpendicular to each other, liquid crystal molecules 7 are arranged parallel to the substrates of the liquid crystal cell and aligned in the rubbing direction. In this structure, the first polarizer 1 may be positioned near the backlight source of the LCD. In this case, the LCD is called an O-mode IPS-LCD when the absorption axis 4 of the first polarizer 1 is parallel to the rubbing direction of the liquid crystal cell, and is called an E-mode IPS-LCD when the absorption axis 4 of the first polarizer 1 near the backlight source is perpendicular to the rubbing direction of the liquid crystal cell.

Polarization elements of the first polarizer 1 and the second polarizer 2 may be made from stretched PVA (polyvinyl alcohol). In order to protect the polarization elements of the first polarizer 1 and the second polarizer 2, a protective film may be provided on one side or both sides of the respective polarizers. Examples suitable for the protective film include a TAC (Triacetate Cellulose) film having a thickness retardation value, a PNB (Polynorbornene) film having a thickness retardation value, a COP film having no thickness retardation value, and a TAC having no thickness retardation value. A protective film having a thickness retardation value, such as a TAC film having a thickness retardation film, is disadvantageous in that it yields a poor viewing angle compensation effect. Instead, the use of an isotropic film, such as unstretched COP films or TAC films having low thickness retardation value (Low Re), assures an improvement in viewing angle compensation properties.

Inner protective films for the polarizers, which are placed to the side of the liquid crystal cells, are required to have superior transmissivity, mechanical strength, heat stability, moisture impermeability, and isotropy. As the inner protective films for the polarizers, films having no negative thickness retardation value or a negative thickness retardation value may be used. Examples of protective films useful in the present invention include films made from polyester-based polymers, such as polyethylene terephthalate and polyethylene phthalate; cellulose-based polymers, such as diacetyl cellulose and triacetyl cellulose; acryl-based polymers, such as polymethylmethacrylate, styrene-based polymers, such as polystyrene and acrylonitrile-styrene copolymer (AS resins); or polycarbonate-based polymers. Alternatively, the protective films may be made from a polymeric material selected from among polyolefinic-based polymers, vinyl chloride-based polymers, amide-based polymers such as nylon and aromatic polyamides, vinyl alcohol-based polymers, vinylidene chloride-based polymers, vinyl butyral-based polymers, allylate-based polymers, polyoxymethylene-based polymers, epoxy-based polymers, and combinations thereof. In addition, heat- or UV-curable resins based on acryl, urethane, acryl urethane, epoxy or silicon may be used.

Now, a description is given of the retardation films which act as the essential components of the present invention. A first negative (−) biaxial retardation film 11 and a second negative (−) biaxial retardation film 13 are placed adjacent to the IPS liquid crystal cell 3 and the second polarizer 2, respectively, while the +C-plate 12 is sandwiched between the first negative (−) biaxial retardation film 11 and the second negative (−) biaxial retardation film 13. Such arrangement is conducted in such a manner that the optical axis 14 of the first negative (−) biaxial retardation film 11 is perpendicular to that of the liquid crystal cell 3 while the optical axis 15 of the second negative (−) biaxial retardation film 13 is perpendicular to the absorption axis 5 of the second polarizer 2. When the absorption axis 4 of the first polarizer 1 is parallel to the optical axis 6 of the liquid crystal cell 3, the optical axis 14 of the first negative (−) biaxial retardation film 11 is arranged parallel to the absorption axis 5 of the second polarizer 2.

Films useful as the first and the second negative (−) biaxial retardation film 11, 13, are exemplified by a uniaxially stretched TAC film, a uniaxially stretched PNB (Polynorbornene) film, a biaxially stretched PC (Polycarbonate) film, a biaxially stretched COP film, and a biaxial liquid crystal (LC) film. In accordance with the present invention, the viewing angle in the diagonal direction can be greatly improved by employing two sheets of negative (−) biaxial retardation films.

The +C-plate 12 may be prepared from a polymer or UV-cured liquid crystal film. For example, a homeotropic aligned liquid crystal film, a biaxially stretched polycarbonate film, or a biaxially stretched COP film may be used.

It is preferred that the relationship between the retardation value of the first and the second negative (−) biaxial retardation film 11, 13, used to compensate the viewing angle of IPS-LCD, and the thickness retardation value of the +C-plate 12, meet the following formula $R_{th,+C}>|R_{th,biaxial}|$, that is, the thickness retardation value of the +C-plate 12 is preferably larger than the absolute value of the sum of the thickness retardation values of the first and the second negative (−) biaxial retardation films 11, 13. Each of the first and the second negative (−) biaxial retardation films 11, 13 preferably ranges in in-plane retardation value from 20 nm to 100 nm when a wavelength of 550 nm is used. As for the +C-plate 12, its thickness retardation value preferably ranges from 50 nm to 500 nm when a wavelength of 550 nm is used.

In accordance with the present invention, the second polarizer 2 is not provided with a separate inner protective film, but the second negative (−) biaxial retardation film 13 positioned on the second polarizer 2 may play a role as an inner protective film of the second polarizer.

In an embodiment according to the present invention, the LCDs additionally comprise a first negative (−) biaxial retardation film, a +C-plate and a second negative (−) biaxial retardation film, as described in the above, between the liquid crystal cell 3 and the first polarizer 1. In this embodiment, the first negative (−) biaxial retardation film is arranged adjacent to the liquid crystal cell in such a manner so that its optical axis is perpendicular to the optical axis of the liquid crystal cell, the second negative (−) biaxial retardation film is arranged adjacent to the first polarizer in such a manner so that its optical axis is perpendicular to the absorption axis of the first polarizer, and the +C-plate is arranged between the first negative (−) biaxial retardation film and the second negative (−) biaxial retardation film.

When a first negative (−) biaxial retardation film, a +C-plate and a second negative (−) biaxial retardation film are positoned between the liquid crystal cell 3 and the first polarizer 1, the second negative (−) biaxial retardation film positioned on the first polarizer may play a role as an inner protective film of the first polarizer.

The retardation films in the structure were simulated with various parameters of in-plane retardation values and thickness retardation values, and the simulation results are summarized in Tables 1 to 4, below.

EXAMPLE 1

The IPS-LCD of Table 1 employed an IPS liquid crystal cell which had a cell gap of 3.4 μm and a pretilt angle of 2° and was filled with liquid crystal molecules having a dielectric anisotropy of $^\Delta\epsilon=+7$ and a birefringence of $^\Delta n=0.1$. For the first negative (−) biaxial retardation film 11, a biaxilly stretched COP film was used the in-plane retardation value and thickness retardation value of which are summarized in Table 1, below. A biaxially stretched COP film was used as the second negative (−) biaxial retardation film 13 and its in-plane retardation value and thickness retardation value are given in Table 1, below. Acting as the +C-plate 12, a UV-cured, homeotropic aligned LC film with $R_{th}$=310 nm was used. The first polarizer 1 included a COP inner protective film having a retardation value of almost zero and a 80 μm-thick TAC outer protective film. The second polarizer 2 included a 80 μm-thick TAC outer protective film and the second negative (−) biaxial retardation film 13 played a role as an inner protective film of the second polarizer 2.

TABLE 1

| Ex. Nos. | Inner Protective Film of First polarizer | Retardation Values of IPS-Panel (nm) | B1-Plate $R_{in}$ (nm) | B1-Plate $R_{th}$ (nm) | $R_{th}$ of +C-Plate (nm) | B2-Plate $R_{in}$ (nm) | B2-Plate $R_{th}$ (nm) | Minimum Contrast Ratio at Tilt Angle of 75° |
|---|---|---|---|---|---|---|---|---|
| 1-1 | Zero Re | 340 | 50 | −105 | 310 | 30 | −115 | 42.8 |
| 1-2 | Film* | | | | | 40 | | 42.8 |
| 1-3 | (COP) | | | | | 50 | | 58.3 |
| 1-4 | | | | | | 60 | | 58.8 |
| 1-5 | | | | | | 70 | | 45.6 |
| 1-6 | | | | | | 80 | | 30.8 |
| 1-7 | Zero Re | 340 | 50 | −115 | 310 | 30 | −115 | 44.2 |
| 1-8 | Film(COP) | | | | | 40 | | 52.6 |
| 1-9 | | | | | | 50 | | 55.3 |
| 1-10 | | | | | | 60 | | 50.0 |
| 1-11 | | | | | | 70 | | 34.7 |
| 1-12 | | | | | | 80 | | 24.3 |
| 1-13 | Zero Re | 340 | 50 | −125 | 310 | 30 | −115 | 41.8 |
| 1-14 | Film(COP) | | | | | 40 | | 44.4 |
| 1-15 | | | | | | 50 | | 42.3 |
| 1-16 | | | | | | 60 | | 36.7 |
| 1-17 | | | | | | 70 | | 26.4 |
| 1-18 | | | | | | 80 | | 19.4 |

Zero Re Film*: Film having retardation value of almost zero

FIG. 5 shows simulation results for the contrast ratios of the LCD at tilt angles from 0° to 80° with respect to entire radius angles when white light was used in the following conditions (Example 1-9) out of the conditions of Table 1. As seen in FIG. 5, the minimum contrast ratio was measured to be 55.3:1 at an tile angle of 75° through the simulation.

| Inner Protective Film of First Polarizer | Retardation Values of IPS-Panel (nm) | B1-Plate $R_{in}$ (nm) | B1-Plate $R_{th}$ (nm) | +C-Plate $R_{th}$(nm) | B2-Plate $R_{in}$ (nm) | B2-Plate $R_{th}$ (nm) | Minimun Contrast Ratio at tilt angle of 75° |
|---|---|---|---|---|---|---|---|
| Zero Re Film(COP) | 340 | 50 | −115 | 310 | 50 | −115 | 55.3 |

EXAMPLE 2

The IPS-LCD of Table 2 employed an IPS liquid crystal cell which had a cell gap of 3.4 μm and a pretilt angle of 2° and was filled with liquid crystal molecules having a dielectric anisotropy of $^\Delta\epsilon=+7$ and a birefringence of $^\Delta n=0.1$. For the first negative (−) biaxial retardation film 11, a biaxilly stretched COP film was used, the in-plane retardation value and thickness retardation value of which are summarized in Table 2, below. A biaxially stretched COP film was used as the second negative (−) biaxial retardation film 13 and its in-plane retardation value and thickness retardation value are given in Table 2, below. Acting as the +C-plate 12, a UV-cured, homeotropic aligned LC film with $R_{th}=320$ nm was used. The first polarizer 1 included a COP inner protective film having a retardation value of almost zero and a 80 μm-thick TAC outer protective film. The second polarizer 2 included a 80 μm-thick TAC outer protective film and the second negative (−) biaxial retardation film 13 played a role as an inner protective film of the second polarizer 2.

EXAMPLE 3

The IPS-LCD of Table 3 employed an IPS liquid crystal cell which had a cell gap of 3.4 μm and a pretilt angle of 2° and was filled with liquid crystal molecules having a dielectric anisotropy of $^\Delta\epsilon=+7$ and a birefringence of $^\Delta n=0.1$. For the first negative (−) biaxial retardation film 11, a biaxially stretched COP film was used, the in-plane retardation value and thickness retardation value of which are summarized in Table 3, below. A biaxially stretched COP film was used as the second negative (−) biaxial retardation film 13 and its in-plane retardation value and thickness retardation value are given in Table 3. Acting as the +C-plate 12, a UV-cured, homeotropic aligned LC film with $R_{th}=330$ nm was used. The first polarizer 1 included a COP inner protective film having a retardation value of almost zero and a 80 μm-thick TAC outer protective film. The second polarizer 2 included a 80 μm-thick TAC outer protective film and the second negative (−) biaxial retardation film 13 played a role as an inner protective film of the second polarizer 2.

TABLE 2

| Ex. Nos. | Inner Protective Film of First polarizer | Retardation Values of IPS-Panel (nm) | B1-Plate $R_{in}$ (nm) | B1-Plate $R_{th}$ (nm) | $R_{th}$ of +C-Plate (nm) | B2-Plate $R_{in}$ (nm) | B2-Plate $R_{th}$ (nm) | Minimum Contrast Ratio at Tilt Angle of 75° |
|---|---|---|---|---|---|---|---|---|
| 2-1 | Zero Re Film*(COP) | 340 | 50 | −105 | 320 | 30 | −115 | 35.4 |
| 2-2 | | | | | | 40 | | 51.2 |
| 2-3 | | | | | | 50 | | 58.3 |
| 2-4 | | | | | | 60 | | 59.1 |
| 2-5 | | | | | | 70 | | 59.1 |
| 2-6 | | | | | | 80 | | 48.9 |
| 2-7 | Zero Re Film(COP) | 340 | 50 | −115 | 320 | 30 | −115 | 41.4 |
| 2-8 | | | | | | 40 | | 55.8 |
| 2-9 | | | | | | 50 | | 58.6 |
| 2-10 | | | | | | 60 | | 59.1 |
| 2-11 | | | | | | 70 | | 57.8 |
| 2-12 | | | | | | 80 | | 38.7 |
| 2-13 | Zero Re Film(COP) | 340 | 50 | −125 | 320 | 30 | −115 | 46.3 |
| 2-14 | | | | | | 40 | | 57.0 |
| 2-15 | | | | | | 50 | | 58.6 |
| 2-16 | | | | | | 60 | | 59.1 |
| 2-17 | | | | | | 70 | | 45.5 |
| 2-18 | | | | | | 80 | | 30.4 |

FIG. 6 shows simulation results for the contrast ratios of the LCD at tilt angles from 0° to 80° with respect to entire radius angles when white light was used in the following conditions (Example 2-9) out of the conditions of Table 2. As seen in FIG. 6, the minimum contrast ratio was measured to be 58.6:1 at an tilt angle of 75° through the simulation.

| Inner Protective Film of First Polarizer | Retardation Values of IPS-Panel (nm) | B1-Plate $R_{in}$ (nm) | B1-Plate $R_{th}$ (nm) | +C-Plate $R_{th}$ (nm) | B2-Plate $R_{in}$ (nm) | B2-Plate $R_{th}$ (nm) | Minimun Contrast Ratio at tilt angle of 75° |
|---|---|---|---|---|---|---|---|
| Zero Re Film(COP) | 340 | 50 | −115 | 320 | 50 | −115 | 58.6 |

TABLE 3

| Ex. Nos. | Inner Protective Film of First polarizer | Retardation Values of IPS-Panel (nm) | B1-Plate $R_{in}$ (nm) | B1-Plate $R_{th}$ (nm) | $R_{th}$ of +C-Plate (nm) | B2-Plate $R_{in}$ (nm) | B2-Plate $R_{th}$ (nm) | Minimum Contrast Ratio at Tilt Angle of 75° |
|---|---|---|---|---|---|---|---|---|
| 3-1 | Zero Re Film (COP) | 340 | 50 | −105 | 330 | 30 | −115 | 31.0 |
| 3-2 | | | | | | 40 | | 45.8 |
| 3-3 | | | | | | 50 | | 58.3 |
| 3-4 | | | | | | 60 | | 59.1 |
| 3-5 | | | | | | 70 | | 59.4 |
| 3-6 | | | | | | 80 | | 57.3 |
| 3-7 | Zero Re Film (COP) | 340 | 50 | −115 | 330 | 30 | −115 | 37.5 |
| 3-8 | | | | | | 40 | | 53.7 |
| 3-9 | | | | | | 50 | | 58.6 |
| 3-10 | | | | | | 60 | | 59.4 |
| 3-11 | | | | | | 70 | | 59.4 |
| 3-12 | | | | | | 80 | | 46.9 |
| 3-13 | Zero Re Film (COP) | 340 | 50 | −125 | 330 | 30 | −115 | 43.9 |
| 3-14 | | | | | | 40 | | 57.0 |
| 3-15 | | | | | | 50 | | 58.8 |
| 3-16 | | | | | | 60 | | 59.4 |
| 3-17 | | | | | | 70 | | 58.3 |
| 3-18 | | | | | | 80 | | 37.2 |

FIG. 7 shows simulation results for the contrast ratios of the LCD at tilt angles from 0° to 80° with respect to entire radius angles when white light was used in the following conditions (Example 3-10) out of the conditions of Table 3. As seen in FIG. 7, the minimum contrast ratio was measured to be 59.4:1 at an angle of 75° through the simulation.

| Retardation Values of IPS-Panel (nm) | Retardation Values of IPS-Panel (nm) | B1-Plate $R_{in}$ (nm) | B1-Plate $R_{th}$ (nm) | +C-Plate $R_{th}$ (nm) | B2-Plate $R_{in}$ (nm) | B2-Plate $R_{th}$ (nm) | Minimum Contrast Ratio at tilt angle of 75° |
|---|---|---|---|---|---|---|---|
| Zero Re Film(COP) | 340 | 50 | −115 | 330 | 60 | −115 | 59.4 |

EXAMPLE 4

The IPS-LCD of Table 4 employed an IPS liquid crystal cell which had a cell gap of 3.4 μm and a pretilt angle of 2° and was filled with liquid crystal molecules having a dielectric anisotropy of $^\Delta\epsilon$=+7 and a birefringence of $^\Delta$n=0.1. For the first negative (−) biaxial retardation film 11, a biaxially stretched COP film having the in-plane retardation value $R_{in}$=50 nm and the thickness retardation value $R_{th}$=−115 nm was used. A biaxially stretched COP film having the in-plane retardation value $R_{in}$=50 nm and the thickness retardation value $R_{th}$=−115 nm was used as the second negative (−) biaxial retardation film 13. Acting as the +C-plate 12, a UV-cured, homeotropic aligned LC film with $R_{th}$=330 nm was used. The first polarizer 1 included a 50 μm-thick TAC film having $R_{th}$=−30 nm or a 80 μm-thick TAC film having $R_{th}$=−50 nm as an inner protective film, and a 80 μm-thick TAC outer protective film. The second polarizer 2 included a 80 μm-thick TAC outer protective film and the second negative (−) biaxial retardation film 13 played a role as an inner protective film of the second polarizer 2.

TABLE 4

| Ex. Nos. | Inner Protective Film of First polarizer | Retardation Values of IPS-Panel (nm) | B1-Plate $R_{in}$ (nm) | B1-Plate $R_{th}$ (nm) | $R_{th}$ of +C-Plate (nm) | B2-Plate $R_{in}$ (nm) | B2-Plate $R_{th}$ (nm) | Minimum Contrast Ratio at Tilt Angle of 75° |
|---|---|---|---|---|---|---|---|---|
| 4-1 | Zero Re Film(COP) | 340 | 50 | −115 | 330 | 50 | −115 | 58.6 |
| 4-2 | 50 μm TAC (−30 nm) | 340 | 50 | −115 | 330 | 50 | −115 | 24.4 |
| 4-3 | 80 μm TAC (−50 nm) | 340 | 50 | −115 | 330 | 50 | −115 | 11 |

FIG. 8 shows simulation results for the contrast ratios of the LCD at tilt angles from 0° to 80° with respect to entire radius angles when white light was used in the following conditions (Example 4-2) out of the conditions of Table 4. As seen in FIG. 8, the minimum contrast ratio was measured to be 24.4:1 at an tilt angle of 75° through the simulation.

| Inner Protective Film of First Polarizer | Retardation Values of IPS-Panel (nm) | B1-Plate | | $R_{th}$ of +C-Plate (nm) | B2-Plate | | Minimum Contrast Ratio at tilt angle of 75° |
|---|---|---|---|---|---|---|---|
| | | $R_{in}$ (nm) | $R_{th}$ (nm) | | $R_{in}$ (nm) | $R_{th}$ (nm) | |
| 50 μm TAC (−30 nm) | 340 | 50 | −115 | 330 | 50 | −115 | 24.4 |

FIG. 9 shows simulation results for the contrast ratios of the LCD at tilt angles from 0° to 80° with respect to entire radius angles when white light was used in the same conditions (Examples 4-3) as in FIG. 8, except for the thickness retardation value($R_{th}$) of the inner protective film of the first polarizer 1. As seen in FIG. 9, the minimum contrast ratio was measured to be 11:1 at an tilt angle of 75° through the simulation.

| Inner Protective Film of First Polarizer | Retardation Values of IPS-Panel (nm) | B1-Plate | | $R_{th}$ of +C-Plate (nm) | B2-Plate | | Minimum Contrast Ratio at tilt angle of 75° |
|---|---|---|---|---|---|---|---|
| | | $R_{in}$ (nm) | $R_{th}$ (nm) | | $R_{in}$ (nm) | $R_{th}$ (nm) | |
| 80 μm TAC (−50 nm) | 340 | 50 | −115 | 330 | 50 | −115 | 11 |

COMPARATIVE EXAMPLE 1

The IPS-LCD of Table 5 employed an IPS liquid crystal cell which had a cell gap of 3.4 μm and a pretilt angle of 2° and was filled with liquid crystal molecules having a dielectric anisotropy of $^{\Delta}\epsilon=+7$ and a birefringence of $^{\Delta}n=0.1$. A biaxially stretched COP film was used as the second negative (−) biaxial retardation film 13 and its in-plane retardation value and thickness retardation value are given in Table 5. Acting as the +C-plate 12, a UV-cured, homeotropic aligned LC film with $R_{th}=120$ nm was used. The first negative (−) biaxial retardation film 11 was not used. The first polarizer 1 included 80 μm-thick TAC films having $R_{th}=-50$ nm as an inner protective film and an outer protective film, and the second negative (−) biaxial retardation film 13 played a role as an inner protective film of the second polarizer 2.

The minimum contrast ratio was measured to be 30:1 at an tilt angle of 75°. This value is very low when compared with the minimum contrast ratio (58.6:1) of the LCD of Example 4-1 at an tilt angle of 75°.

TABLE 5

CR properties in the LCD using one negative (−) biaxial film and one +C-plate

| Ex./ C. Ex. Nos. | Inner Protective Film of First Polarizer | Retardation Values of IPS-Panel (nm) | B1-Plate | | $R_{th}$ of +C-Plate (nm) | B2-Plate | | Minimum Contrast Ratio at tilt angle of 75° |
|---|---|---|---|---|---|---|---|---|
| | | | $R_{in}$ (nm) | $R_{th}$ (nm) | | $R_{in}$ (nm) | $R_{th}$ (nm) | |
| C. Ex. 1 | 80 μm TAC (−50 nm) | 340 | B1-plate not available | | 120 | 66 | −128 | 30 |
| Ex. 4-1 | Zero Re Film(COP) | 340 | 50 | −115 | 330 | 50 | −115 | 58.6 |

The invention claimed is:

1. An in-plane switching mode liquid crystal display, comprising a liquid crystal cell filled with liquid crystal molecules having positive dielectric anisotropy (Δε>0) which are horizontally aligned between two substrates, placed between a first polarizer and a second polarizer, respective absorption axes of which are perpendicular to each other, wherein a) a first negative (−) biaxial retardation film, arranged adjacent to the liquid crystal cell in such a manner so that its optical axis is perpendicular to an optical axis of the liquid crystal cell; b) a second negative (−) biaxial retardation film, arranged adjacent to the second polarizer in such a manner so that its optical axis is perpendicular to an absorption axis of the second polarizer; and c) a +C-plate arranged between the first negative (−) biaxial retardation film and the second negative (−) biaxial retardation film, are provided between the liquid crystal cell and the second polarizer.

2. The in-plane switching mode liquid crystal display according to claim 1, wherein the +C-plate has a thickness retardation value larger than the absolute value of the sum of thickness retardation values of the first negative (−) biaxial retardation film and the second negative (−) biaxial retardation film.

3. The in-plane switching mode liquid crystal display according to claim 1, wherein the first negative (−) biaxial retardation film ranges in in-plane retardation value from 20 nm to 100 nm when a wavelength of 550 nm is used.

4. The in-plane switching mode liquid crystal display according to claim 1, wherein the second negative (−) biaxial retardation film ranges in in-plane retardation value from 20 nm to 100 nm when a wavelength of 550 nm is used.

5. The in-plane switching mode liquid crystal display according to claim 1, wherein the +C-plate ranges in thickness retardation value from 50 nm to 500 nm when a wavelength of 550 nm is used.

6. The in-plane switching mode liquid crystal display according to claim 1, wherein the first or the second negative (−) biaxial retardation film is selected from a group consisting of a uniaxially stretched TAC (triacetate cellulose) film, a uniaxially stretched PNB (polynorbornene) film, a biaxially stretched PC (polycarbonate) film, a biaxially stretched COP (cyclo-olefin polymer) film, a UV-curable, biaxial liquid crystal film, and combinations thereof.

7. The in-plane switching mode liquid crystal display according to claim 1, wherein the +C-plate is a homeotropic aligned UV-curable liquid film, a polymer film or combinations thereof.

8. The in-plane switching mode liquid crystal display according to claim 1, wherein the first or the second polarizer is provided with a protective film on one side or both sides thereof.

9. The in-plane switching mode liquid crystal display according to claim 8, wherein the protective film is selected from a group consisting of a TAC (triacetate cellulose) film having a thickness retardation value, a PNB (polynorbornene) film having a thickness retardation value, a COP film having no thickness retardation values, and a TAC film having no thickness retardation value.

10. The in-plane switching mode liquid crystal display according to claim 1, wherein the first or the second polarizer is provided with an inner protective film at a side thereof facing the liquid crystal cell, said inner protective film having a thickness retardation value of zero or negative thickness retardation values.

11. The in-plane switching mode liquid crystal display according to claim 10, wherein the inner protective film of the first or the second polarizer is made from a polymeric material selected from a group consisting of polyester-based polymers, cellulose-based polymers, acrylic-based polymers, styrenic-based polymers, polycarbonate-based polymers, polyolefinic polymers, vinyl chloride-based polymers, amide-based polymers, vinyl alcohol-based polymers, vinylidene chloride-based polyoxymethylene-based polymers, epoxy-based polymers, urethanic-based resins, acryl urethanic-based resins, epoxy-based resins, silicon-based resins, and combinations thereof.

12. The in-plane switching mode liquid crystal display according to claim 1, wherein the second negative (−) biaxial retardation film is used as an inner protective film for the second polarizer.

13. The in-plane switching mode liquid crystal display according to claim 1, comprising a backlight source placed near the first polarizer or the second polarizer.

14. The in-plane switching mode liquid crystal display according to claim 13, wherein the first polarizer is placed near the backlight source.

15. The in-plane switching mode liquid crystal display according to claim 1, wherein the first polarizer has an absorption axis perpendicular or parallel to an optical axis of the liquid crystal cell.

16. The in-plane switching mode liquid crystal display according to claim 1, additionally comprising d) a third negative (−) biaxial retardation film, arranged adjacent to the liquid crystal cell in such a manner so that its optical axis is perpendicular to an optical axis of the liquid crystal cell; e) a fourth negative (−) biaxial retardation film, arranged adjacent to the first polarizer in such a manner so that its optical axis is perpendicular to an absorption axis of the first polarizer; and f) an additional +C-plate arranged between the third negative (−) biaxial retardation film and the fourth negative (−) biaxial retardation film, between the liquid crystal cell and the first polarizer.

17. The in-plane switching mode liquid crystal display according to claim 16, wherein the fourth negative (−) biaxial retardation film is used as an inner protective film for the first polarizer.

* * * * *